(12) United States Patent
Fergusson et al.

(10) Patent No.: US 6,472,501 B1
(45) Date of Patent: *Oct. 29, 2002

(54) PROCESS FOR MAKING NYLON 6,6

(75) Inventors: Stuart B. Fergusson, Kingston (CA); Ernest Keith Marchildon, Kingston (CA); Ahmet Turgut Mutel, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/872,352

(22) Filed: Jun. 1, 2001

(51) Int. Cl.$^7$ .......................... C08G 69/04; C08G 69/08
(52) U.S. Cl. ................. 528/310; 528/322; 528/324; 528/332; 528/335
(58) Field of Search ................. 528/310, 332, 528/322, 324, 335

(56) References Cited

U.S. PATENT DOCUMENTS

| | | |
|---|---|---|
| 2,245,129 A | 6/1941 | Greenewalt |
| 3,847,876 A | 11/1974 | Onsager |
| 4,436,898 A | 3/1984 | Hofmann et al. |
| 4,490,521 A | 12/1984 | Coffey et al. |
| 4,501,881 A | 2/1985 | Greene et al. |
| 4,528,362 A | 7/1985 | Hofmann et al. |
| 4,542,205 A | 9/1985 | Curatolo et al. |
| 4,603,192 A | 7/1986 | Coffey et al. |
| 4,725,666 A | 2/1988 | Curatolo et al. |
| 4,749,776 A | 6/1988 | Sentman et al. |
| 5,627,257 A | 5/1997 | Liehr |
| 5,674,974 A * | 10/1997 | Breasley et al. ............ 528/340 |
| 6,021,096 A | 2/2000 | Schlieter et al. |
| 6,075,117 A | 6/2000 | Hayes et al. |
| 6,103,863 A | 8/2000 | Hayes et al. |
| 6,194,538 B1 * | 2/2001 | Weiss et al. ................ 528/310 |
| 6,201,096 B1 * | 3/2001 | Marchildon et al. ........ 528/310 |

* cited by examiner

*Primary Examiner*—P. Hampton-Hightower
(74) *Attorney, Agent, or Firm*—Gerald E. Deitch

(57) ABSTRACT

Process for making Nylon 6,6 by reacting adiponitrile, hexamethylenediamine and steam in a multistage distillation column reactor.

7 Claims, 5 Drawing Sheets

PROCESS FOR MAKING NYLON 6,6

BACKGROUND OF THE INVENTION

1. Field of the Invention

The present invention relates to a process for the production of polyamide, including nylon 6,6 and nylon 6,6 containing low levels of comonomer, by reaction of adiponitrile with hexamethylene diamine in the presence of water.

2. Description of Related Art

Commercially, nylon-6,6 is made by the reaction of adipic acid with hexamethylenediamine (HMD). However, it is also known that polyamides, such as nylon-6,6, can be produced by reaction of diamines and dinitriles in the presence of water. Several patents address processes directed at such a reaction.

U.S. Pat. No. 2,245,129 discloses a process for the production of a linear polyamide polymer by a process which reacts adiponitrile (AND), HMD, and water at high temperature and pressure to produce nylon-6,6. The examples of this patent show reaction in a heated closed reaction vessel. The reactants were allowed to cool and then heated so that ammonia and water were vented from the vessel.

U.S. Pat. No. 3,847,876 discloses a process for the production of polyamides by reacting a diamine with a dinitrile in the presence of a controlled amount of ammonia. This process uses pressures of up to 2000 psig (13.7 MPa).

A number of patents disclose improvements of the aforementioned processes by use of a catalyst to promote formation of nylon. See for example, U.S. Pat. Nos. 4,490,521, 4,542,205, 4,603,192, 4,725,666, 4,749,776, 4,436,898, 4,501,881, 4,528,362, 6,075,117, and 6,103,863.

U.S. Pat. No. 5,627,257 discloses a process where in a first step, AND is hydrolyzed in the presence of water, catalyst, and 0 to 10 weight percent of the total HMD needed for the reaction. In a second step, the remainder of the HMD is added and the polymerization allowed to proceed. This two step process requires long process times.

U.S. Pat. No. 6,103,863 discloses a process for the production of polyamide from dinitrile (such as AND) and diamine (such as HMD) by a two-step process. First, the dinitrile is contacted with water and a catalyst to obtain at least 95% hydrolysis of the dinitrile. The reactor is purged of water and the ammonia produced by the reaction. Second, the diamine is added to the reaction and polymerization is allowed to occur. For this process the reactor design is not critical. Stirred autoclaves, unstirred autoclaves, column reactors, tube reactors, and loop reactors are given as examples of suitable reactors. The process has a disadvantage in that it requires the use of a catalyst and the use of either multiple reactors or interrupted addition of reactants to a single reactor.

U.S. Pat. No. 6,021,096 discloses a process for the production of a polyamide by reaction of an omega-aminonitrile with water in a vertical multistage reactor that is swept by steam. For example, this patent discloses a process to convert 6-aminocapronitrile to nylon-6. The process has a disadvantage in that it requires that the amine reactive group and the nitrile reactive group be part of the same reactive molecule (the omega-aminonitrile). Because hydrolysis of the nitrile group takes place throughout the reactor, the amine group is susceptible to degradation reactions caused by the conditions required for nitrile hydrolysis.

It would be desirable to have a process for making polyamide (including both nylon 6,6 and nylon 6,6 that contains some comonomer) that can be carried out (1) with or without catalyst, (2) in a single reactor, without interrupted introduction of reactants to the reactor and (3) using one reactant that contains a nitrile reactive group and a different reactant that contains an amine reactive group, so that the nitrile group can be hydrolyzed without adversely affecting the amine group.

BRIEF SUMMARY OF THE INVENTION

The present invention is a continuous process for the manufacture of nylon 6,6 from adiponitrile (AND) comprising the steps of:

a) providing a vertical countercurrent multistage reactor having a top and a bottom, and having upper stages and lower stages, said reactor being equipped with internal perforated barrier means for establishing a plurality of stages and for effecting contact of an AND-containing stream and a countercurrently-flowing steam stream;

b) introducing into said reactor an AND-containing reactant stream at an AND introduction point near the top of said reactor;

c) introducing into said reactor a steam-containing stream at least one point near the bottom of said reactor;

d) introducing into said reactor a hexamethylenediamine-containing stream at least one point below the AND introduction point;

e) maintaining a pressure within said reactor between 100 and 800 psig (0.69 and 5.52 MPa) and a temperature at the top of said reactor between 190 and 250 degrees C and a temperature at the bottom of said reactor between 260 and 290 degrees C;

f) withdrawing a steam and ammonia-containing stream overhead of said reactor;

g) recovering a nylon 6,6-containing product stream from the bottom of said reactor;

wherein in said process the introducing of the AND-containing reactant stream and the introducing of the HMD-containing stream are adapted to provide a nylon 6,6-containing product stream in which the nylon 6,6 is characterized by balanced amine and acid ends.

DETAILED DESCRIPTION OF INVENTION

Figure 1:
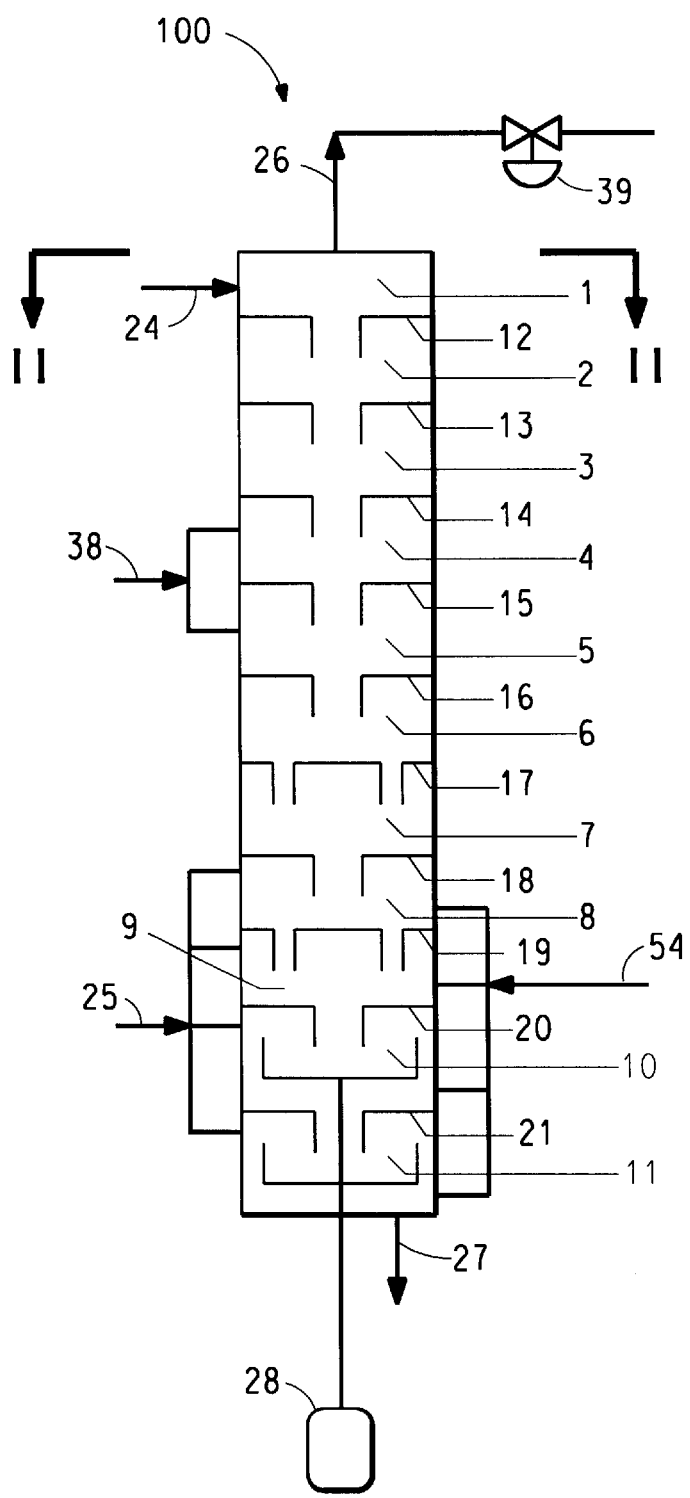
FIG. 1 is a schematic cross-sectional side-view of one embodiment of a vertical multistage reactor useful for performing the continuous polymerization process according to the instant invention. The reactor is divided into discrete stages 1–11 using perforated barriers 12–21

The process of the current invention is a continuous process for preparing polyamides (both nylon 6,6 and nylon 6,6 that contains comonomer) by reaction of adiponitrile and hexamethylenediamine and water in a countercurrent multistage column reactor. The adiponitrile is hydrolyzed by reacting with dissolved water which is supplied and replenished by steam flowing countercurrently to the direction of flow of the adiponitrile and subsequent reaction products, and the adiponitrile hydrolysis product is polymerized with hexamethylenediamine under the operating conditions of the column to form a nylon 6,6 polyamide.

A solution of adiponitrile is fed continuously near the top of the multistage column reactor. The feed is preferably pure adiponitrile or an aqueous solution, containing preferably between about 80 and 95 weight percent adiponitrile. The adiponitrile feed is supplied to the column at a temperature that most facilitates the establishment and maintenance of the desired temperatures in the column. The feed temperature generally should be between the temperature required to keep the feed substantially in the molten state (i.e. where it is capable of being pumped) and the temperature of the liquid within the column at the point of entry. Saturated steam, or steam containing a small amount of water, or superheated steam at a temperature up to about that of the liquid within the reactor at the point where the steam enters, is fed continuously to one or more of the lower stages of the column reactor at a weight flow rate (lb/hr) that is at least 30 percent of and preferably approximately equal to the weight flow rate of the feed. A solution of hexamethylenediamine is fed continuously to one or more stages of the column reactor that are lower than the stage or stages at which adiponitrile is introduced into the column. Hexamethylenediamine feed is supplied to the column pure or as an aqueous solution. If an aqueous solution is used it preferably contains between 80 and 90 weight percent hexamethylenediamine. The amount of hexamethylenediamine feed is approximately equimolar to the amount of adiponitrile feed.

The feed optionally includes a catalyst. Oxygen-containing phosphorus compounds, such as those disclosed in Curatolo et al. U.S. Pat. No. 4,568,736, are preferred. For example, phosphorous acid, phosphonic acid, alkyl- and aryl-substituted phosphonic acid, hypophosphorous acid, phosphoric acid, mixtures thereof and the like can be used. Any phosphorus compound that hydrolyzes to an oxygenated phosphorus acid or a salt during the reaction is also useful. The oxygen-containing phosphorus catalysts are typically added at a weight percent, relative to the adiponitrile, of 0.05 to 0.3, preferably 0.1 to 0.2. Preferred catalysts include phosphoric acid, phosphorous acid, phenyl phosphinic acid, and 2-(2'-pyridyl)ethyl phosphonic acid. Dicarboxylic acids, such as disclosed in Hayes et al. U.S. Pat. No. 6,075,117 may also be used. Adipic acid is preferred.

The adiponitrile and hexamethylenediamine feeds can include a mixture of dinitriles, diacids, diamines or omega-aminonitriles as well as other polyamide-forming monomers that will react. Among such monomers are those which, each by itself, possess amide-forming capability, such as lactams, aminoalkylamides and aminoacids. They may be included in any ratio to the adiponitrile. Examples are caprolactam, 6-aminocaproamide, and 6-aminocaproic acid. Another class of monomers are those which must be added in combination with other monomers in order to form amide links. Such monomers are diacids, diamines, diamides and dinitriles. They may be included singly in small amounts, generally no more than about 50 gram-moles per million grams of final polymer, in order to achieve a desired difference between carboxyl and amine ends. They may be included as stoichiometrically-balanced pairs of complementary functionality in any ratio to the adiponitrile. Examples are adipic acid, methylpentamethyldiamine, adipamide, and isophthalic acid. These other components can be added as a liquid or as a solid slurried in with the adiponitrile. All of the components should be fully or largely soluble in the column reactor under the conditions of temperature, pressure, and liquid composition within the column and fully soluble under conditions in the bottom one-third of the reactor.

To produce a nylon 6,6 product with time-wise uniformity suitable for commercial end use, it is necessary to monitor and control the difference between the concentration of the carboxyl acid functional end groups and the concentration of the amine functional end groups in the resulting nylon 6,6 polyamide by an appropriate control system. This requirement is especially stringent for product that will eventually be formed into fibers that will be treated with dyes that attach themselves to one or the other of the two functional groups.

To achieve this control a measurement is made of some characteristic in the nylon 6,6 polymer leaving the final stage of the reactor that is sufficiently sensitive to the concentration difference between the acid ends and the amine ends. The method must be accurate to within about plus or minus 0.5 units in the difference in acid and amine ends concentration (gram equivalent ends per million grams of polymer). Preferably the polyamide has balanced amine and acid ends, or a slight excess of acid ends, so that a high molecular weight polyamide is obtained. Any analytical method of this approximate accuracy, that is rapid enough to give answers in a timely enough fashion to effect process control, would be suitable. In general, manual titrimetric methods, though sufficiently accurate, are not rapid enough to give meaningful process control. A preferred method of monitoring reactor output is by near-infrared spectrophotometry. The near-infrared analysis measures the difference between acid and amine ends to an acceptable degree of accuracy with a sufficiently timely response. Based on this analysis, changes are made in the hexamethylenediamine feed into or near the bottom stage of the reactor system. By "into or near" is meant that this feed is into the bottom reactor stage, into the stage immediately above the bottom stage or into the transfer line leading out of the bottom reactor stage. Most preferably, this feed is into the transfer line.

Standard distillation columns are suitable for use in the process of the current invention if the residence times in the stages is increased to give sufficient time for hydrolysis of the nitrile groups. The required liquid residence time in the reactor is between about one hour and four hours to achieve a sufficient extent of nitrile hydrolysis.

Figure 2:
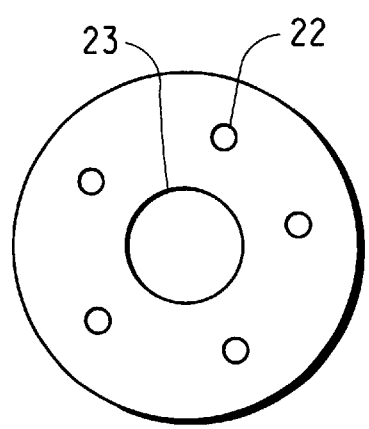
FIG. 2 is a cross-sectional view of the vertical multistage reactor of FIG. 1 as seen through line II—II.

The column reactor is equipped with internals, such as, but not limited to, perforated plates and agitators, so as to cause effective staged contact of the countercurrently flowing steam with the liquid reaction mixture to ensure substantially complete hydrolysis of the nitrile groups and removal of ammonia generated by chemical reaction. As illustrated in FIG. 1, the internal configuration of a multistage reactor, generally designated by the number 100, suitable for use in the current invention is divided into discrete stages 1–11 using perforated barriers 12–21 between the stages. The barriers, see FIG. 2, can be plates having small perforations 22 which allow the vapor to flow upward from stage to stage, and a larger downcomer tube 23 which leads from each stage into and below the surface of the reaction mixture in the stage below, allowing the liquid to flow downward from stage to stage. The number of stages is chosen to achieve a high rate, per unit of liquid volume, of mass transfer and chemical reaction. Five to fifteen stages are typical.

The adiponitrile feed 24 is fed continuously near the top of the multistage column reactor 100 and steam 25 is fed continuously to one or more stages at or near the bottom of the reactor. The hexamethylenediamine feed 54 is fed continuously to one or more stages of the column reactor that are located below the stage at which adiponitrile is introduced. Steam and ammonia vapor are removed at the top of the column as vapor stream 26. Nylon 6,6 polyamide product 27 is continuously removed from the bottom stage 11. The column preferably includes means to separate and return to the column any adiponitrile and/or hexamethylenediamine which leaves the top part of the column as a vapor or as an entrained liquid. One such means is a partial condenser (not shown) at the top of the column. The condenser is maintained at a temperature sufficient to condense and return most of the adiponitrile and/or hexamethylenediamine to the column, while allowing steam and ammonia to be removed in vapor stream 26. Additionally, one or more stages can be added to the column reactor above the adiponitrile feed stage, and a partial condenser can be provided above the uppermost of these stages to provide reflux liquid.

Figure 3:
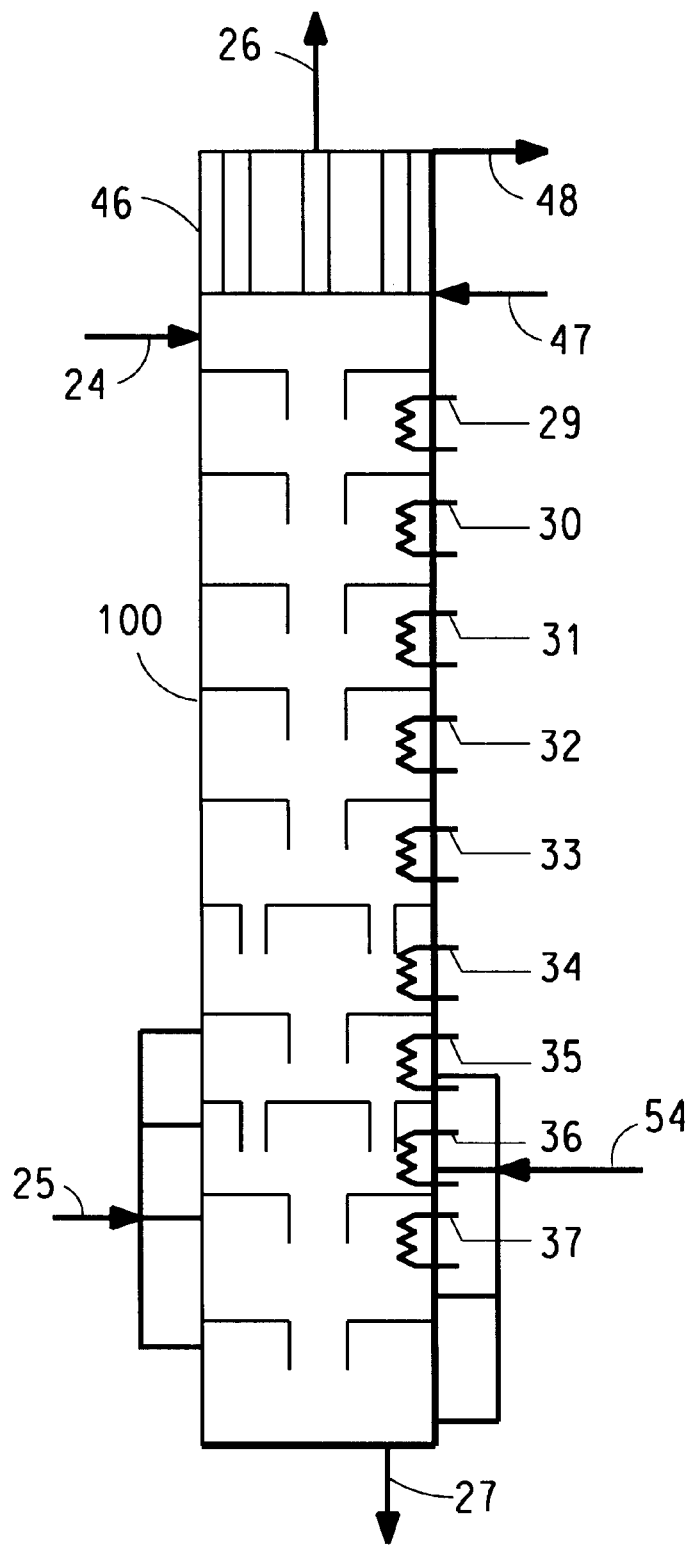
FIG. 3 is a schematic cross-sectional side-view of a vertical multistage reactor illustrating the presence of an independent heating element 29–37 at each reactor stage.

The temperature in the column is maintained sufficiently high that the reaction mixture does not freeze. The temperature at the top stage 1 of the column is maintained at a lower temperature than the temperature at the bottom stage 11. The top temperature is maintained at a temperature that is high enough to achieve a good rate of hydrolysis of the adiponitrile, while avoiding excessive volatilization of adiponitrile and/or hexamethylenediamine. It is possible to use a combination of upper stage temperature and a partial condenser to minimize outflow of these two reactants. The temperature of bottom stage 11 should be high enough to obtain adequate polymerization rate, but not so high as to obtain degradation. For example, secondary amines can form when amine ends condense with each other. Secondary amines are undesirable because they create branch points in the polymer and loss of desirable properties in use. The potential for forming secondary amines exists throughout the column; therefore, it is important that the average temperature of the stages not exceed a value above which the formation of secondary amines becomes detrimental to the product. Averaging over the bottom two-thirds of the reactor, this temperature is approximately 280° C. Because the hydrolysis reaction is exothermic, the column is optionally equipped with means for water injection 38 at all or selected stages for temperature control. The top stage is preferably maintained between about 190° C. and 250° C., and the bottom stage is preferably operated between about 260° C. and 290° C. All or most stages are preferably equipped with means for independent control of temperature. This control is best accomplished by use of a hot flowing liquid heat transfer medium passing through jackets, coils, or other heat-transfer devices 29–37 (see FIG. 3), which can be used for both heating and cooling.

The column is operated at elevated pressure, preferably above 50 psig (0.34 MPa), more preferably 100 to 300 psig (0.69 to 2.07 MPa) with catalyst and 400 to 800 psig (2.76 to 5.52 MPa) without catalyst to obtain substantially complete hydrolysis of the nitrile ends in the adiponitrile, which is required to obtain good quality polymer. The product should preferably contain no more than about 10 to 20 gram-equivalents per million grams of polymer of unhydrolyzed nitrile ends, in order to be capable of being subsequently readily raised to the highest average molecular weight required for a particular end use. The pressure can be controlled by means of a pressure control valve 39, the opening of which is continuously adjusted to vary the outflow of vapor stream 26 in response to the measured pressure in the vessel. Under the conditions of temperature and of the concentration of water, amine functional groups and catalyst in the reactor, the nitrile ends are largely converted, in combination with amine functional groups, into amide linkages, with consumption of water and release of ammonia. The ammonia is removed from the reactor in vapor stream 26.

One of the advantages of the process of the invention is that the countercurrent operation of the column results in continual flushing, by steam, of ammonia away from the lower parts of the reactor up through the upper parts and out the top exit vapor stream. It is important to minimize the concentration of ammonia in the lower part of the column for two reasons: (1) ammonia reacts with and breaks amide linkages, hence limiting the growth of polymer molecular weight, and (2) ammonia in the vapor reduces the partial pressure of steam in the vapor and hence the concentration of water dissolved in the liquid, which reduces the rate of nitrile hydrolysis. These two effects can be especially damaging in the lower part of the reactor, where amide linkages are highest and where the rate of nitrile hydrolysis is already slow because few nitrile ends are left.

In the upper stages of the column, the viscosity of the reaction mixture is low enough that with appropriate design of the perforated barriers 12–21, gas bubbles from the steam and ammonia vapor result in effective mixing in the reaction mixture. At the bottom of the column, where the viscosity is highest, a mixer 28 is preferably used in one or more of the bottom most stages in the reactor. In the reactor shown in FIG. 1, mechanical mixing is provided in the bottom two stages.

Preferably, to minimize liquid by-pass between the stages, mixing in each stage is induced by either proper arrangement of coils, to assist gas induced mixing, or by mechanical agitation in lower stages, where gas mixing is not sufficient due to high viscosities. Liquid by-pass reduces the desired reaction efficiency resulting in either a requirement for a larger size reactor to achieve the same conversion at a given flow rate and/or increased ratio of side reactions to preferred reaction, resulting in quality problems. Height-to-diameter ratio for each stage is preferably between 0.5 to 1.2 to achieve the desired mixing efficiency.

Axial mixing between the stages in the column reactor as a result of liquid backflow through the downcomers (induced by large bubbles either entering the downcomers or forcing liquid into the downcomers as they approach the downcomers) will reduce the overall nitrile conversion efficiency in the column reactor. This will result in either a requirement for a larger size reactor to achieve the same conversion at a given flow rate and/or increased ratio of side reactions to preferred reaction resulting in quality problems. The following preferred arrangements of downcomers can be employed in this column reactor.

Figure 6:
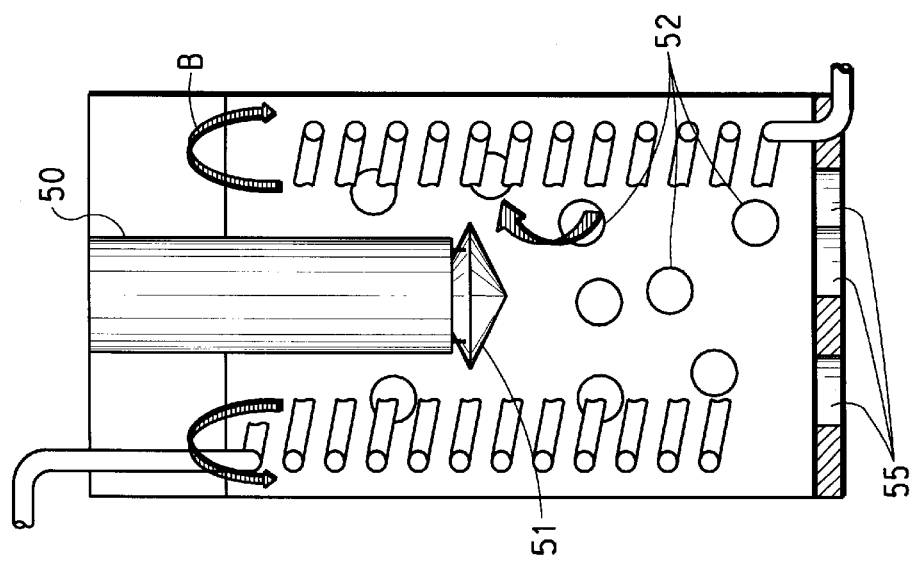
FIG. 6 is a schematic cross-section side-view of a reactor stage containing a circular central downcomer having a bi-conical attachment at the bottom to deflect gas bubbles.

As illustrated in FIG. 6, the circular central downcomer 50 preferably has a bi-conical attachment 51 at the bottom to deflect the gas bubbles 52 away from the downcomer and to prevent gas bubbles entering the downcomer, as well as to deflect the liquid exiting the downcomer. The gap between the attachment 51 and the bottom of the downcomer 50 is important to minimize liquid backflow in the downcomer induced by the pressure field created by the gas bubbles travelling near the downcomer exit. The gap is adjusted such that the pressure drop created by liquid flow is between 0.5 to 1.0 inches of liquid.

Figure 8:
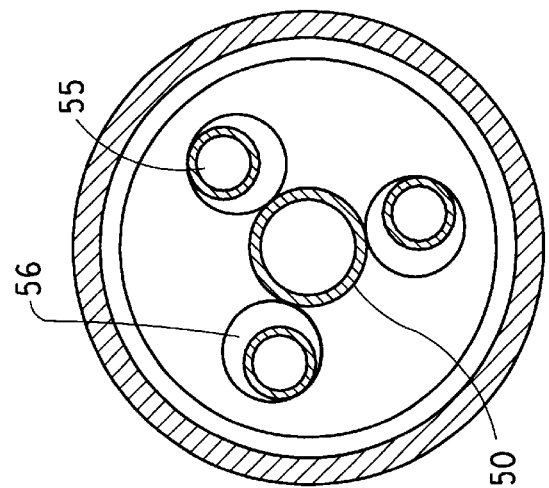
FIG. 8 is a cross-sectional view of the vertical reactor stage of FIG. 7 stacked on top of the vertical reactor stage of FIG. 6 as seen through line VIII—VIII.
Figure 7:
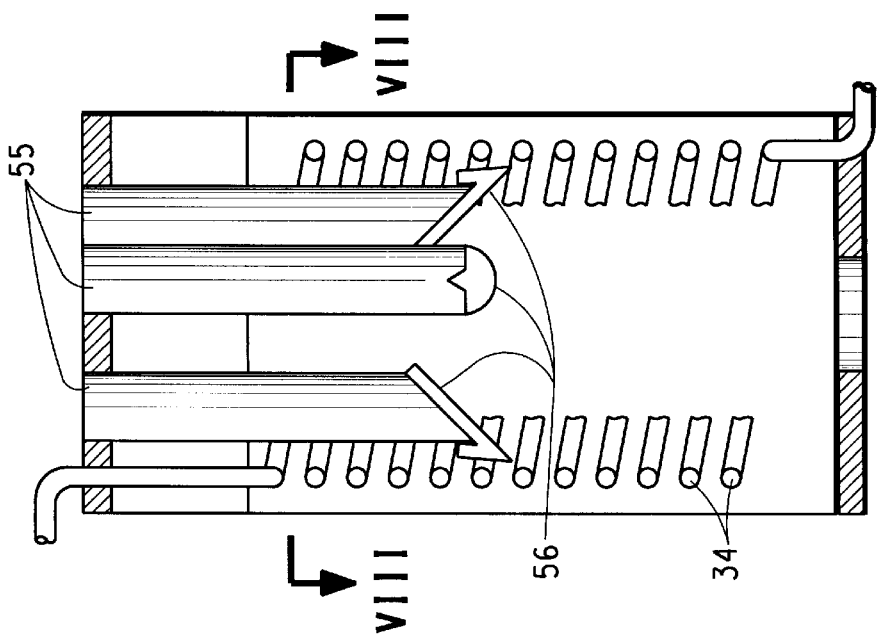
FIG. 7 is a schematic cross-section side-view of a reactor stage containing multiple downcomers arranged in a triangular pattern wherein each downcomer is truncated at an angle with an extended ellipsoidal plate to deflect gas bubbles.

Another preferred arrangement is multiple downcomers 55 arranged in a triangular pattern, as illustrated in FIG. 7. The bottoms of these downcomers 55 are truncated at an angle between 30 to 60 degrees, and each is provided with a welded extended ellipsoidal plate 56 to deflect the gas bubbles. Liquid is allowed to exit through a rectangular slit protected by the extended plate and pressure dissipating attachment. Slit dimensions are chosen to produce a pressure drop of between 0.5 inches to 1.0 inch liquid to minimize backflow. The preferred arrangement of downcomers 50 and 55 with respect to each other is shown in FIG. 8 to achieve maximum mixing efficiency in the stage.

Preferably the reactor stages are configured as flooded trays to facilitate an agitator shaft to pass through the downcomers (not illustrated) to avoid sealing a rotating shaft against liquid. Typically, mechanical mixing is required at the bottom two or three stages of the reactor to minimize liquid by-pass. In these stages mixing induced by gas traffic (as implied by flow arrows in FIG. 6) may not be sufficient to achieve the desired quality of mixing at higher viscosities encountered. Even though weir trays can be employed above agitated stages, flooded trays are still preferred because they allow reactor level control to be achieved by measurement at the uppermost stage where it is most convenient.

Figure 5:
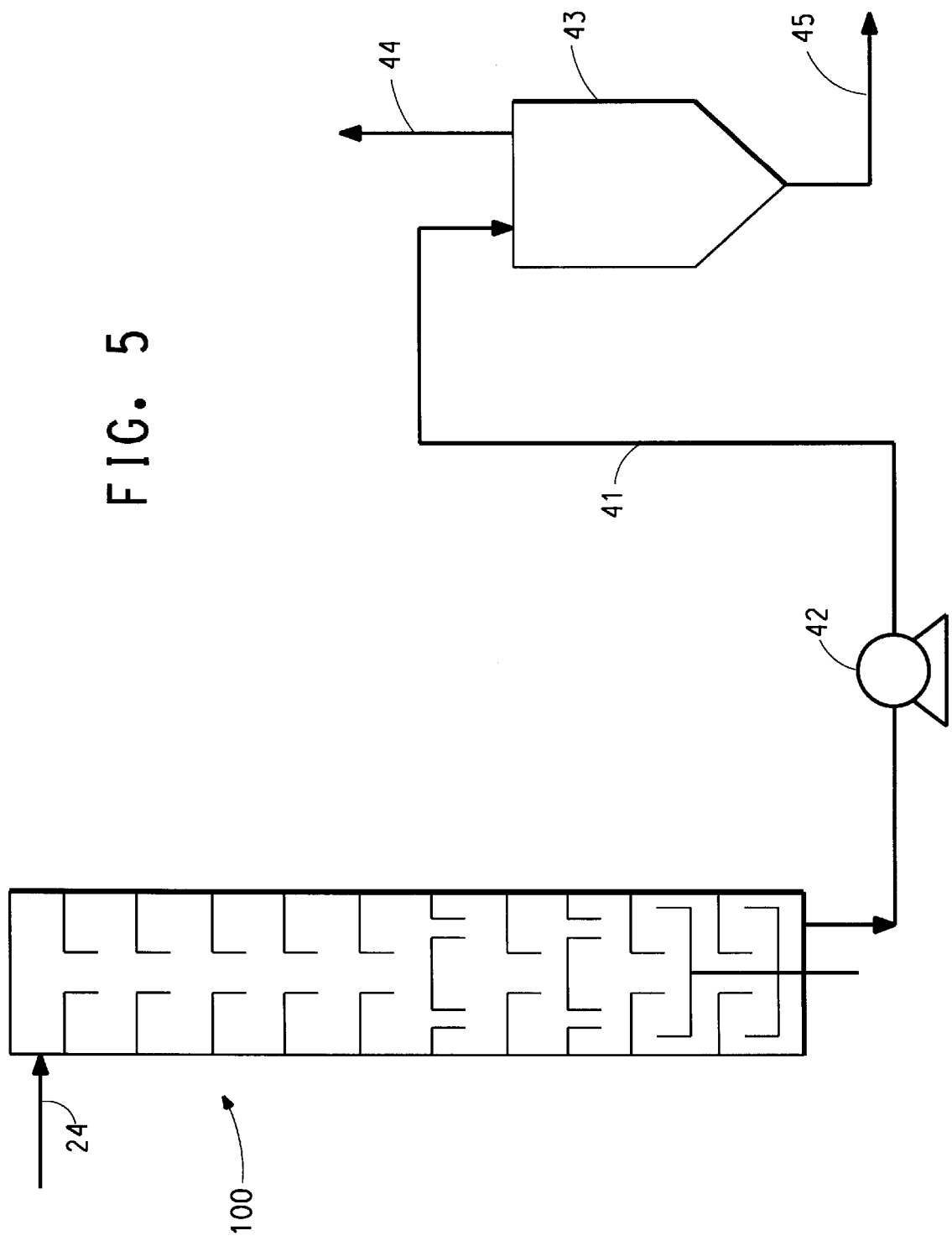
FIG. 5 schematically illustrates one preferred method of treating the product exiting the multistage reactor column such as to separate water vapor 44 from the liquid product stream 45.

The nylon 6,6 polyamide product 27 removed from the bottom of the column generally will be a prepolymer having a number-average molecular weight of between about 3,000 and 8,000 and a relative viscosity (RV) between about 6 and 16. The product contains a content of dissolved water more or less proportional to the pressure of the column reactor. At typical pressures of operation, this moisture is enough to disrupt most methods of pelletization. Consequently, means are provided, following the column reactor, to reduce the pressure of the reaction mixture and thus to reduce the moisture content by volatilization. A preferred method, shown in FIG. 5, is to pass the mixture through a pipe 41 sized to bring about most of the reduction in pressure by means of frictional resistance to flow and heated to compensate for the heat of vaporization. The pipe is usually preceded by a valve or a pump 42 to control the flow rate. At the end of the pipe is a vessel 43 or a wider section of pipe, sized to allow almost complete separation of vapor 44 and liquid 45. This separation is carried out at a pressure low enough to at least reduce the water content to the level where the polymer can be pelletized. This pressure could be above atmospheric pressure. More typically the separator is operated at atmospheric pressure or under vacuum. The separator 43 is heated to maintain the polymer in the molten state and to establish an optimum temperature, typically between about 270° C. and 285° C., to accomplish further removal of dissolved moisture without causing undue degradation of the polymer. Separator 43 is preferably agitated to enhance further removal of dissolved moisture and to provide blending. The vapor 44, which contains low molecular weight cyclic oligomers and steam, can be recycled. The polyamide can be held in the separator to increase viscosity of the prepolymer to values suitable for the desired end use, for example about 50 for apparel fiber and molding applications, about 60–70 for carpet fiber, and about 70 and higher for industrial fiber. Operating the separator under vacuum will further increase the molecular weight of the polyamide product. The polyamide product 45 removed from the separator can be pelletized using methods known in the art such as strand casting. If higher relative viscosity (RV) is desired, the pelletized polyamide product can be solid phase polymerized by heating the pellets in a flowing inert atmosphere such as nitrogen or in superheated steam, using methods known in the art.

Figure 4:
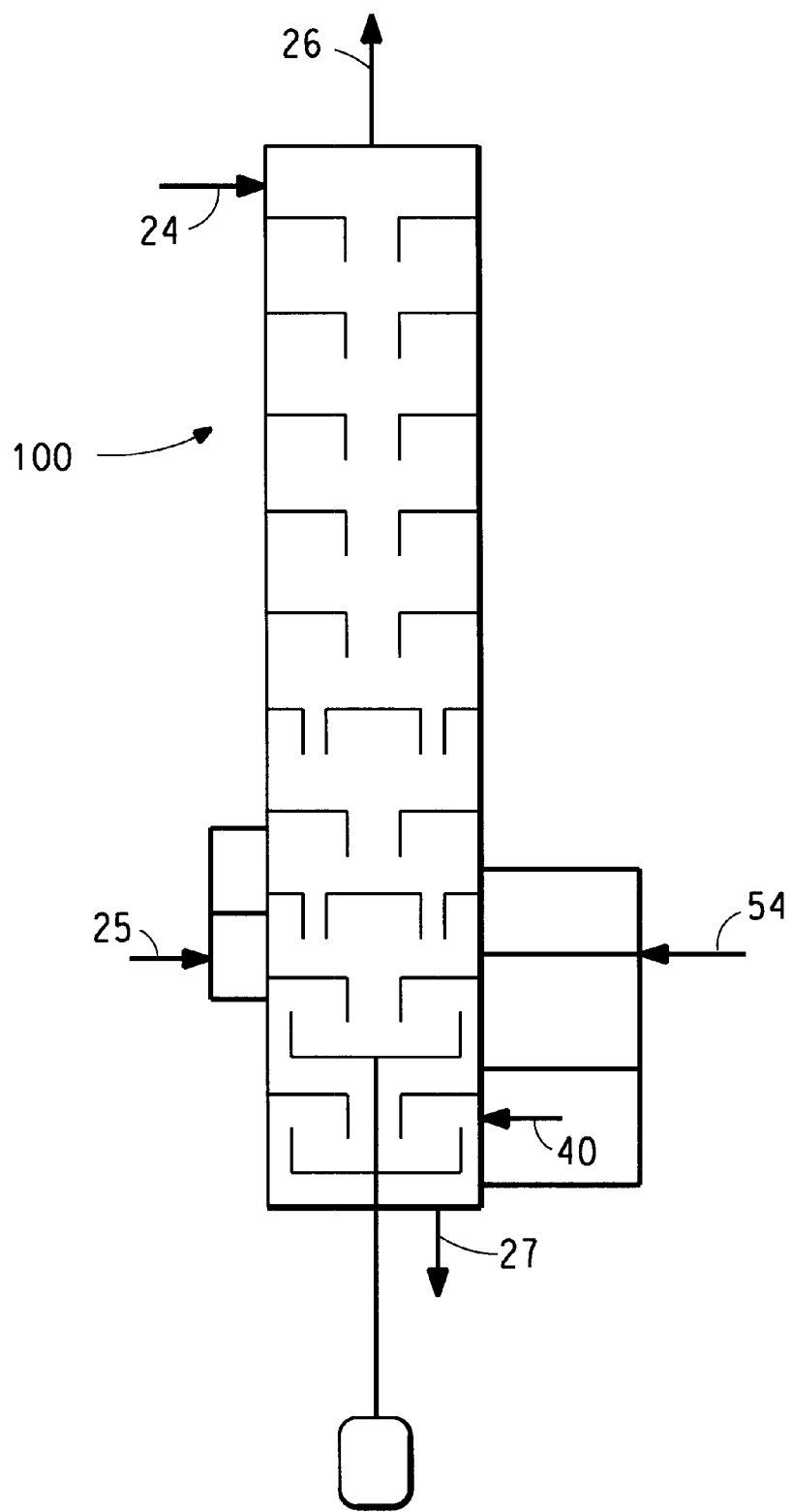
FIG. 4 is a schematic cross-sectional side-view of a vertical multistage reactor illustrating a method of reducing moisture content of the polymer product by supplying nitrogen 40 to the reactor column.

An alternative method of reducing the moisture content of the polymer, with the objective of making it pelletizable, is to supply nitrogen 40 to the column reactor at one or more locations below the bottom-most point of steam injection, as shown in FIG. 4.

The following nonlimiting examples are presented to further illustrate various aspects and features of the present invention.

EXAMPLES

Test Methods

The nylon 6,6 that could be prepared in accordance with the Examples would be analyzed for amine and acid ends by the methods described on pages 293 and 294 in volume 17 of the "Encyclopedia of Industrial Chemical Analysis" published by John Wiley & Sons, Inc. in 1973. Nitrile ends would be measured by infra-red absorption in the range of 2240–2245 $cm^{-1}$.

The relative viscosity (RV) of the polyamide samples would be measured as the ratio of the viscosity of a solution of 8.4 wt % polymer in a solution of 90 wt % formic acid and 10 wt % water at 25° C., to the viscosity of the formic acid-water solution, measured in the same units at 25° C.

Example 1

A counter-current column reactor with 11 stages would be fed continuously at the top stage with a mixture containing adiponitrile (80 weight percent), water (20 weight percent) and phosphoric acid (0.1 weight percent) at a rate of 50 lb/hr. Superheated steam would be injected continuously at the third and fourth stages from the bottom of the reactor at a rate of 15.0 lb/hr for each stage. Vapour of hexsamethylenediamine would be supplied continuously in to the upper part of each of the bottom two stages. Total flow of the hexamethylenediamine would be approximately 43 lb/hr The reactor would be approximately 20 feet high and have an 8 inch internal diameter. Each stage of the reactor would be separated from the stage above and below it by a horizontal perforated barrier. The barriers would consist of circular plates having a thickness of ⅛ to ¾ inch, with between 6 to 16 holes of ⅛ inch diameter drilled on a holes-circles of diameters 4 and 6 inches for vapour passage, and fitted with one or three downcomers for liquid passage. The reactor temperature would be controlled on each stage so that a gradient existed, with the top stage of the reactor at 220 C and the bottom stage at 276 C. The column pressure would be controlled at 265 psig (1.83 MPa). The total liquid hold up time in the column would be approximately 3 to 4 hours. The vapour leaving the top of the reactor would consist of mainly steam (approximately 23.3 lb/hr) and ammonia (approximately 12.6 lb/hr). The liquid leaving the bottom of the reactor would contain nylon 66 prepolymer and approximately 5.3% by weight water. It would contain less than 20 moles of nitrile functional end groups per million grams of nylon 66.

Example 2

A counter-current column reactor with 11 stages would be fed continuously at the top stage with a mixture containing adiponitrile (80 weight percent) and water (20 weight percent) at a rate of 50 lb/hr. Superheated steam would be injected continuously at the third and fourth stages from the bottom of the reactor at a rate of 15.0 lb/hr for each stage. Vapour of hexamethylenediamine would be supplied continuously into the upper part of each of the bottom two stages. Total flow of the hexamethylenediamine would be approximately 43 lb/hr.

The reactor would be approximately 20 feet high and have an 8 inch internal diameter. Each stage of the reactor would be separated from the stage above and below if by a horizontal perforated barrier. The barriers would consist of circular plates having a thickness of 1/8 to 3/4 inch, with between 6 to 16 holes of 1/8 inch diameter drilled on a holes-circles of diameters 4 and 6 inches for vapour passage, and fitted with one or three downcomers for liquid passage.

The reactor temperature would be controlled on each stage so that a gradient existed, with the top stage of the reactor at 240 C and the bottom stage at 276 C. The column pressure would be controlled at 600 psig (4.14 MPa). The total liquid hold up time in the column would be approximately 3 to 4 hours.

The vapour leaving the top of the reactor would consist of mainly steam (approximately 12.6 lb/hr) and ammonia (approximately 0.1 lb/hr). The liquid leaving the bottom of the reactor would contain nylon 6,6 prepolymer. It would contain less than 20 moles of nitrile functional end groups per million grams of nylon 66.

What is claimed is:

1. A continuous process for the manufacture of nylon 6,6 from adiponitrile (AND) comprising the steps of:

a) providing a vertical countercurrent multistage reactor having a top and a bottom, and having upper stages and lower stages, said reactor being equipped with internal perforated barrier means for establishing a plurality of stages and for effecting contact of an AND-containing stream and a countercurrently-flowing steam stream;

b) introducing into said reactor an AND-containing reactant stream at an AND introduction point near the top of said reactor;

c) introducing into said reactor a steam-containing stream at least one point near the bottom of said reactor;

d) introducing into said reactor a hexamethylenediamine-containing stream at least one point below the AND introduction point;

e) maintaining a pressure within said reactor between 100 and 800 psig (0.69 and 5.52 MPa) and a temperature at the top of said reactor between 190 and 250 degrees C and a temperature at the bottom of said reactor between 260 and 290 degrees C;

f) withdrawing a steam and ammonia-containing stream overhead of said reactor;

g) recovering a nylon 6,6-containing product stream from the bottom of said reactor;

wherein in said process the introducing of the AND-containing reactant stream and the introducing of the HMD-containing stream are adapted to provide a nylon 6,6-containing product stream in which the nylon 6,6 is characterized by balanced amine and acid ends.

2. The process of claim 1 wherein the AND-containing stream comprises substantially pure AND or an aqueous solution containing 80 to 95 percent AND by weight.

3. The process of claim 2 wherein the hexamethylenediamine-containing stream comprises substantially pure hexamethylenediamine or an aqueous solution containing 80 to 90 percent hexamethylenediamine by weight.

4. The process of claim 3 wherein the pressure within said reactor is 400 to 800 psig (2.76 to 5.52 MPa).

5. The process of claim 4 wherein an oxygen-containing phosphorous catalyst is fed to the reactor.

6. The process of claim 5 wherein the oxygen-containing phosphorous catalyst is phosphorous acid, phosphonic acid, alkyl- and aryl-substituted phosphonic acid, hypophosphorous acid, phosphoric acid, or mixtures thereof.

7. The process of claim 6 wherein the pressure within said reactor is 100 to 300 psig (0.69 to 2.07 MPa).

* * * * *

UNITED STATES PATENT AND TRADEMARK OFFICE
CERTIFICATE OF CORRECTION

PATENT NO. : 6,472,501 B1
DATED : October 29, 2002
INVENTOR(S) : Stuart B. Fergusson et al.

It is certified that error appears in the above-identified patent and that said Letters Patent is hereby corrected as shown below:

Title page,
Item [54], Title, replace "AND" with -- ADN --.

Column 1,
Lines 19, 35 and 41, replace "AND" with -- ADN --.

Column 2,
Lines 11, 17, 19, 20, 26 and 37, replace "AND" with -- ADN --.

Column 9,
Lines 38 and 43, replace "AND" with -- ADN --.

Column 10,
Lines 1, 2, 8, 19, 25 and 26, replace "AND" with -- ADN --.

Signed and Sealed this

Fourth Day of November, 2003

JAMES E. ROGAN
*Director of the United States Patent and Trademark Office*